United States Patent [19]

Kudler

[11] Patent Number: 4,564,208
[45] Date of Patent: Jan. 14, 1986

[54] TRAILER STABILIZER

[75] Inventor: Paul S. Kudler, New Waterford, Ohio

[73] Assignee: Majestic Rides Mfg. Co., Inc., New Waterford, Ohio

[21] Appl. No.: 590,903

[22] Filed: Mar. 19, 1984

[51] Int. Cl.$^4$ .............................................. B62D 53/00
[52] U.S. Cl. ............................ 280/423 B; 280/425 A; 267/138; 414/481
[58] Field of Search .......... 280/423 B, 425 R, 425 A, 280/2, 486; 414/495, 481; 267/138

[56] References Cited

U.S. PATENT DOCUMENTS

| | | | |
|---|---|---|---|
| 2,774,613 | 12/1956 | Martin | 280/423 B |
| 3,756,443 | 9/1973 | Verschage | 280/423 B |
| 4,018,452 | 4/1977 | Wagatsuma | 267/138 |
| 4,103,793 | 8/1978 | Weaver | 414/481 |
| 4,171,927 | 10/1979 | Aoyama | 414/495 |

Primary Examiner—Joseph F. Peters, Jr.
Assistant Examiner—Everett G. Diederiks, Jr.
Attorney, Agent, or Firm—Harpman & Harpman

[57] ABSTRACT

A trailer stabilizer for use on a self-contained amusement ride to stabilize and reduce movement between the trailer body and a movable point of attachment referred to as the goose neck which directly engages the fifth wheel of a truck cab.

5 Claims, 5 Drawing Figures

TRAILER STABILIZER

BACKGROUND OF THE INVENTION

1. Technical Field

This invention relates to self-contained amusement rides fabricated into a trailer and transported by attaching to a truck cab. These rides contain a movable goose neck to provide a point of attachment to the fifth wheel of a truck cab. The goose neck is also utilized as the ride's entrance, which is unique in its field.

2. Description of the Prior Art

Prior art devices of this type have used a fixed trailer goose neck that had to be positioned at the rear of the ride. Applicant knows of no prior art devices that relate to a movable trailer goose neck utilizing a spring resistant stabilizer to minimize relative movement between the main trailer body and the attached movable trailer goose neck such as applicant proposes.

SUMMARY OF THE INVENTION

A trailer stabilizer used on a self-contained amusement ride having a movable trailer goose neck. The stabilizer restricts the movement of the main trailer body during transportation and stabilizes the same to insure trailer control and overall trailer height integrity.

DESCRIPTION OF THE DRAWINGS

FIG. 3 is a perpsective view of a portion of the trailer frame and goose neck with the stabilizer of FIG. 2;

FIG. 4 is a side plan view of the stabilizer of FIG. 3 with portions broken away.

DESCRIPTION OF THE PREFERRED EMBODIMENT

Figure 1:
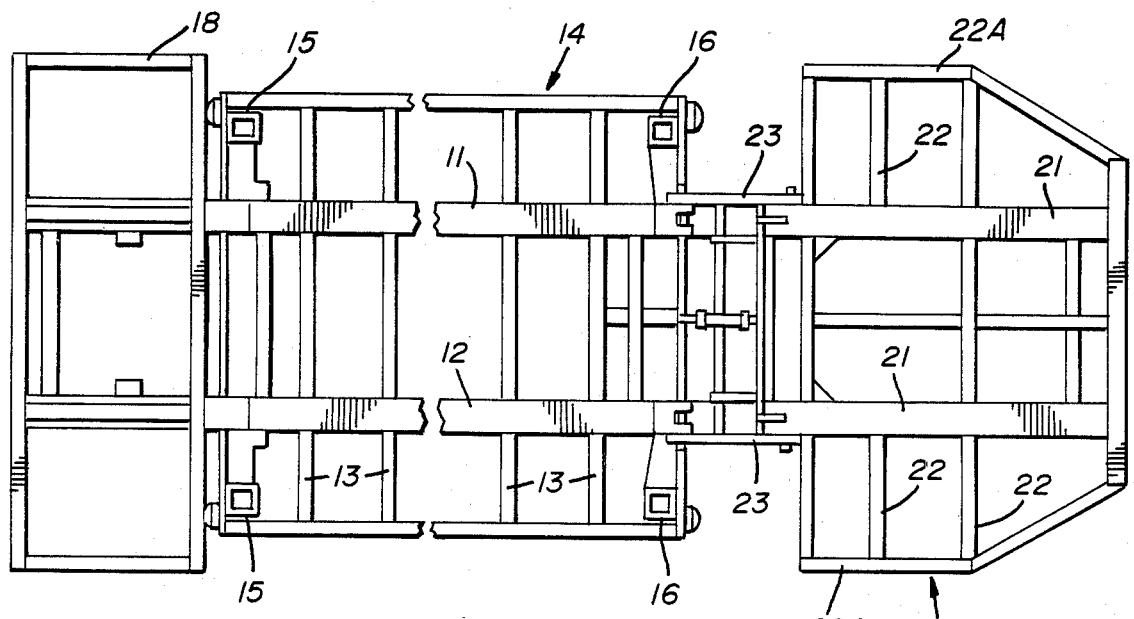
FIG. 1 is a top plan view of a trailer frame with a movable goose neck and stabilizer.
Figure 2:
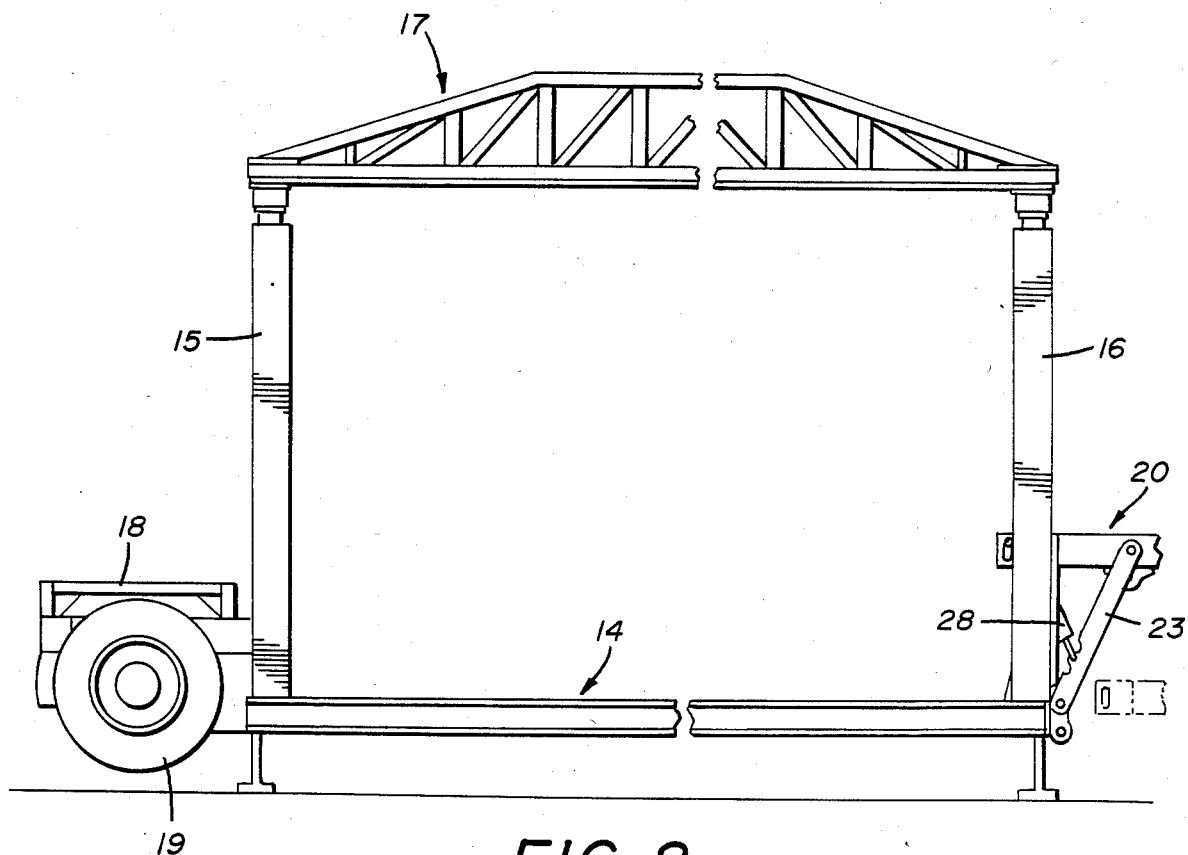
FIG. 2 is a side elevation of a trailer frame.

A trailer frame can be seen in FIGS. 1 and 2 of the drawings having a pair of spaced parallel beams 11 and 12 to which is secured a plurality of cross support rail members 13 defining a generally rectangular main trailer frame 14. Pairs of oppositely disposed horizontally spaced support posts 15 and 16 are secured at the respective four corners of said main trailer frame 14.

The post pairs 15 and 16 support a truss assembly 17 as seen in FIG. 2 of the drawings. A rear wheel support frame 18 is secured to one end of said main trailer frame 14 and has vertically adjustable wheels 19 thereon. A trailer goose neck frame 20 is movably secured to the other end of said main trailer frame 14 and comprises a secondary pair of spaced parallel beams 21 with secondary cross support rails 22 and side rails 22A on the ends thereof. The goose neck frame 20 is movably secured to said main trailer frame 14 by a pair of oppositely disposed arms 23 that extend from a bar 24. The bar 24 is secured to the main trailer frame 14 by pairs of lugs 25 mounted on spaced vertical members 26, best seen in FIG. 3 of the drawings.

Figure 5:
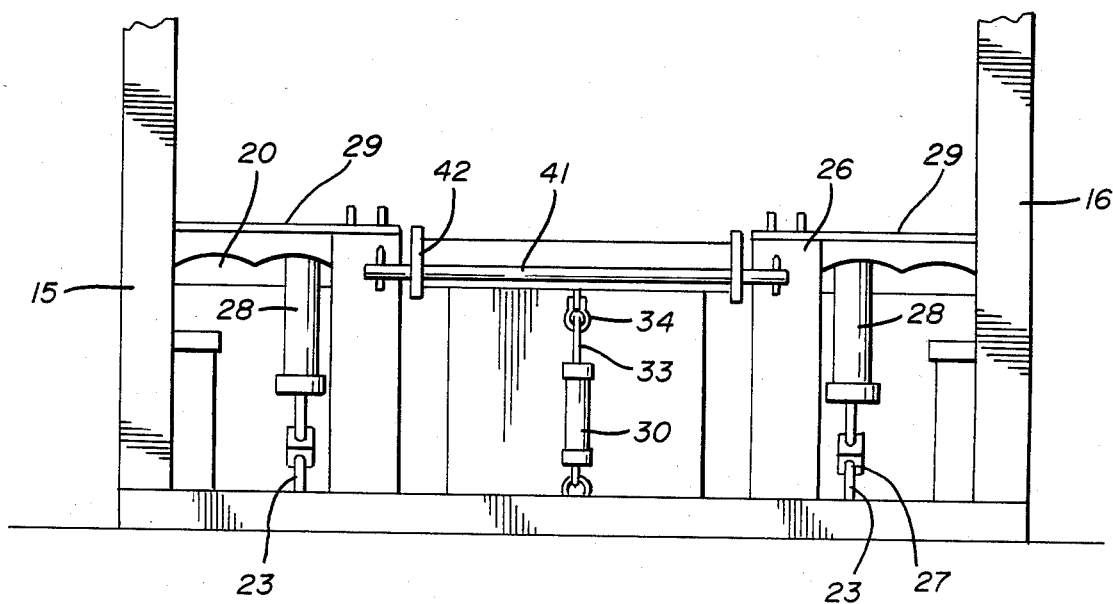
FIG. 5 is a front plan view of a portion of the trailer and goose neck showing the stabilizer in extended position.

Each of said arms 23 has an apertured lug 27 inwardly from one end to which is attached a hydraulic piston and cylinder assembly 28 that is pivotally secured to a horizontally disposed mounting bracket 29 extending between said spaced parallel vertical members 26 and the post 15, and 16 as best seen in FIG. 5 of the drawings. The arms 23 are pivotally attached to the secondary beams 21 inwardly from their ends the goose neck frame 20 facing said main trailer frame 14.

In use, activation of the piston and cylinder assembly 28 moves the arms 23 and the attached goose neck trailer frame 20 from a transportation and storage position shown in FIGS. 2 and 5 of the drawings to an in-use position indicated in broken lines in FIG. 2 of the drawings.

Referring now to FIG. 4 of the drawings, a stabilizer 30 can be seen having a tubular body member 31 and an apertured end cap 32 on one end thereof. A rod 33 has a bifurcated bracket 34 on one end with the rod 33 extending partially into said tubular body member 31 through said apertured cap 32. A spring 35 is mounted on the rod 33 within said tubular body member 31 and held thereon by a spring retainer disc 36 on the free end of said rod 33. A secondary end cap 37 on the other end of said tubular member has a threaded fitting 38 extending therefrom with a secondary rod 39 and bifurcated bracket 40 thereon. A lock nut 41 on said secondary rod adjustably secures the secondary rod 39 and the bifurcated bracket 40 to the length required.

It will be seen that the rod 33 is spring urged so that progressive restraint is imparted thereto as it is pulled outwardly from said tubular body member 31.

Referring now to FIG. 5 of the drawings, the stabilizer 30 in use is exerting a maximum force between said goose neck trailer frame 20 and said main trailer frame 14 when in the transportation and storage position thereby limiting relative movement therebetween and effectively stabilizing said main trailer frame 14.

Conversely, it will be apparent that when the goose neck is in the use position, the stabilizer 30 is exerting minimum force therebetween as is required. A locking bar 41 extends between and through a pair of outwardly extending aperture tab members 42 from the goose neck trailer frame 20 and it will be apparent from FIG. 5 of the drawings that the bar 41 acts as a lock to maintain the goose neck trailer frame 20 in the transportation and storage position.

It will thus be seen that a new and useful stabilizer assembly has been illustrated and described and it will be apparent to one skilled in the art that various changes and modifications may be made therein without departing from the spirit of the invention and having thus described my invention what I claim is:

1. An improvement in a portable self-contained amusement ride, said amusement ride including a main trailer frame having a rear wheel support frame secured to a first end thereof, a truss assembly secured in spaced vertical relation to said main frame, pairs of oppositely disposed spaced support posts secured to said main trailer frame supporting said truss assembly, the improvement comprising a trailer gooseneck frame movably secured to a second end of said main trailer frame, a pair of oppositely disposed arms movably secured to said main trailer frame and said gooseneck frame, a self-adjusting stabilizer secured between said main trailer frame and said trailer gooseneck frame to reduce relative movement therebetween by adjustably urging the trailer gooseneck frame constantly towards the main trailer frame, means for moving said gooseneck frame in relation to said main trailer frame.

2. The improvement in a portable self-contained amusement ride of claim 1 wherein said means for moving said trailer gooseneck frame comprises a pair of piston and cylinder assemblies secured to said main trailer frame and said oppositely disposed arms respectively.

3. The improvement in a portable self-contained amusement fride of claim 1 wherein said self adjusting stabilizer comprises a tubular body member, and apertured cap on one end of said body member, a rod extending through said cap into said body member, a spring positioned on said rod, spring retaining means on one end of said rod within said body member, a bracket on the end of said rod outside of said body member pivotally secured to said trailer goose-neck frame, means for adjustably securing the other end of said body member to said main trailer frame.

4. The trailer stabilizer of claim 3 wherein said spring retaining means is a disc of a diameter less than that of the body member and greater than the diameter of the spring.

5. The trailer stabilizer of claim 3 wherein said means for adjustably securing said other end of said body member to said main trailer frame comprises a secondary end cap having a threaded fitting extending therefrom, a secondary rod engaging said threaded fitting, and a bracket on said rod for pivotal attachment to said main trailer frame.

* * * * *